United States Patent [19]

Melles

[11] 4,138,907
[45] Feb. 13, 1979

[54] HYDROMECHANICAL TRANSMISSION WITH OVERSPEED LIMITED VARIABLE DRIVE

[75] Inventor: Harold W. Melles, Downers Grove, Ill.

[73] Assignee: International Harvester Company, Chicago, Ill.

[21] Appl. No.: 829,324

[22] Filed: Aug. 31, 1977

Related U.S. Application Data

[63] Continuation-in-part of Ser. No. 601,783, Aug. 4, 1975, abandoned.

[51] Int. Cl.$^2$ .............................................. F16H 47/04
[52] U.S. Cl. ............................................................ 74/687
[58] Field of Search ........................... 74/687, 689, 688

[56] References Cited

U.S. PATENT DOCUMENTS

| 2,153,997 | 4/1939 | Verderber et al. | 74/687 |
|---|---|---|---|
| 2,446,462 | 8/1948 | Dodge | 74/689 |
| 2,496,977 | 2/1950 | Bechle | 74/689 UX |
| 2,517,879 | 8/1950 | Howard | 74/687 X |
| 3,055,233 | 9/1962 | Giles | 74/687 |
| 3,293,943 | 12/1966 | MacDonald | 74/687 |
| 3,411,381 | 11/1968 | Orshansky, Jr. | 74/687 |
| 3,786,696 | 1/1974 | Aleem | 74/687 |
| 3,905,251 | 9/1975 | Greene | 74/687 |

FOREIGN PATENT DOCUMENTS 1150884  6/1963  Fed. Rep. of Germany ............. 74/687

Primary Examiner—Lance W. Chandler
Attorney, Agent, or Firm—William H. Wendell; Ronald C. Kamp; F. David AuBuchon

[57] ABSTRACT

The operational speed of a fluid drive unit in a hydromechanical transmission is limited by means of an overspeed preventing, one-way clutch establishing a positive drive connection between torque transmitting elements of the hydromechanical transmission. Two power paths are established between the planetary gear unit and the input shaft of the transmission to drive an output shaft at a variable drive ratio controlled by a variable displacement type of fluid drive unit. One of the power paths is established through fixed ratio gearing while the other power path is established through the fluid drive units while operating within a speed ratio range limited by the one-way clutch.

20 Claims, 4 Drawing Figures

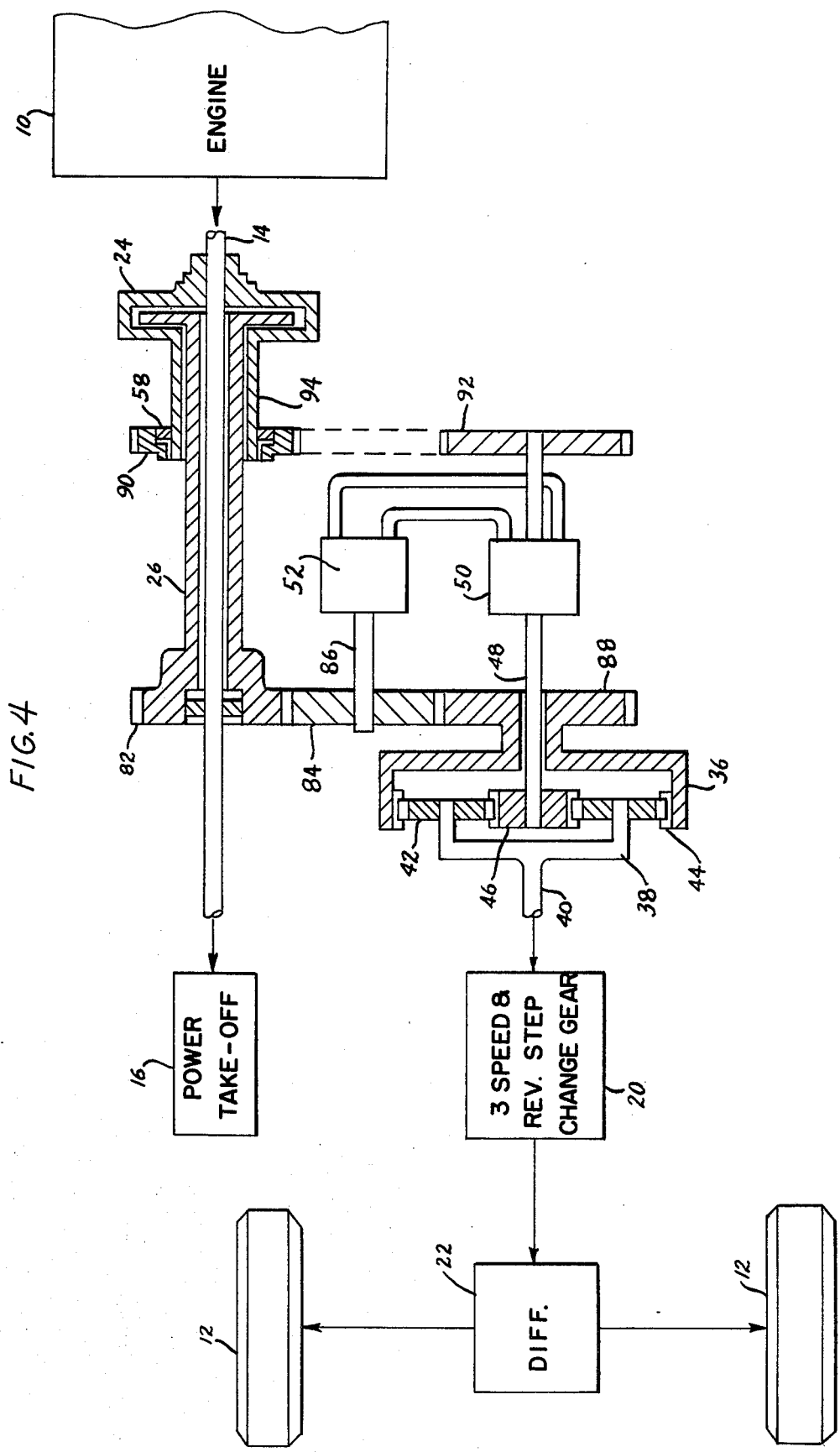

HYDROMECHANICAL TRANSMISSION WITH OVERSPEED LIMITED VARIABLE DRIVE

This is a continuation-in-part of application Ser. No. 601,783, filed Aug. 4, 1975, now abandoned.

BACKGROUND OF THE INVENTION

This invention relates to a variable speed drive of the hydromechanical type in which the drive ratio is varied by means of fluid pump-motor units.

Hydromechanical transmissions wherein two power paths are combined by a planetary gear unit to obtain a drive ratio that is varied through a hydrostatic pump-motor assembly in one of the power paths are well known. Examples of such hydromechanical transmissions are dis-closed in U.S. Pat. Nos. 3,090,253, 3,736,813 and 3,733,931.

The foregoing type of hydromechanical drive is often used in combination with a plural change speed gear box of the shiftable type because of the relatively small variation in drive ratio associated with the hydromechanical drive and the relatively low torque capacity of the fluid pump-motor units. The shift type of change speed transmission will therefore provide a plurality of speed range steps while the fluid drive units are operative to effect an infinite variation in drive ratio within each speed range. Transmission combinations of the foregoing type are particularly suited for heavy duty vehicles such as earth moving vehicles and agricultural tractors.

A serious problem arises in heavy duty installations employing the aforementioned types of transmission assemblies because of a destructive overspeed condition that occurs whenever a relatively large input torque is suddenly applied as would occur, for example, during starting or sudden clutch engagement. The overspeed condition arises because of the low numerical drive ratio of the planetary gear unit and is accompanied by excessive torque loading of the fluid drive unit. It is therefore an important object of the present invention to provide a hydromechanical transmission that will automatically prevent the aforementioned destructive overspeed condition for the fluid drive unit.

SUMMARY OF THE INVENTION

In accordance with the present invention, a hydromechanical transmission is interconnected in series with a three-speed and reverse shiftable type of gear transmission between the prime mover or engine and the differential of a heavy duty type of vehicle in order to provide an inifinitely variable change in drive ratio within each of the forward and reverse drive ranges of the shift type transmission. The hydromechanical transmission includes a planetary gear unit, having an output planet gear carrier, and sun and orbit gears respectively associated with separate power paths from the engine through an input clutch. One power path is established through countershaft gearing at a fixed drive ratio for positive and continuous transmission of power to the oribt gear while the other power path is established through a pair of fluid drive units that are hydraulically interconnected for yieldable transmittal of torque in both directions. One of the fluid drive units is coupled to the sun gear of the planetary gear unit while the other fluid drive gear unit is drivingly connected to the engine upon engagement of the input clutch. The fluid drive unit driven by the engine may be of the variable displacement type and is operative to provide an infinite variation in the drive ratio between the engine and the output shaft connected to the carrier of the planetary gear unit. The other fluid drive unit may be of the fixed displacement type that would ordinarily be subject to the destructive overspeed condition when serving as a torque reaction device for the planetary gear unit during a regenerative power circulation mode of operation in the hydromechanical transmission. However, overspeed of the fixed displace-ment drive unit is prevented by automatic engagement of a one-way clutch associated with countershaft gearing that drivingly interconnects the sun gear with the engine in one direction to establish a speed ratio limit between the fluid drive units. Below this limiting speed ratio and during transmission of torque from the engine to the planetary gear unit through both power paths, the oneway clutch freewheels.

BRIEF DESCRIPTION OF THE DRAWING FIGURES

FIG. 4 is a somewhat schematic illustration of a vehicle power transmission arrangement with the hydromechanical transmission of an alternative embodiment of the present invention shown somewhat diagrammatically in section.

DETAILED DESCRIPTION OF A PREFERRED EMBODIMENT

Figure 1:
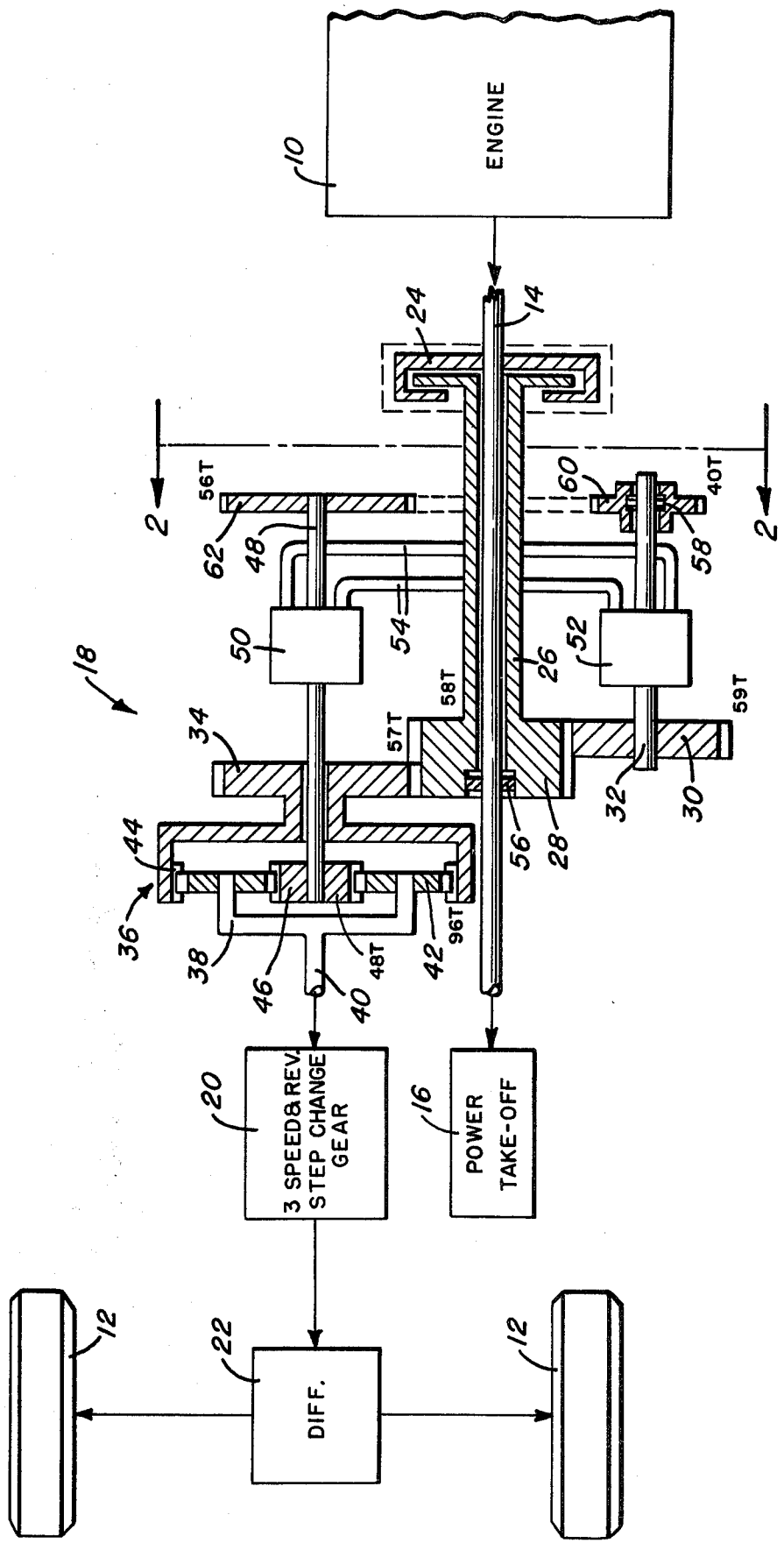
FIG. 1 is a somewhat schematic illustration of a vehicle power transmission arrangement with the hydromechanical transmission of the present invention shown somewhat diagrammatically in section.
Figure 2:
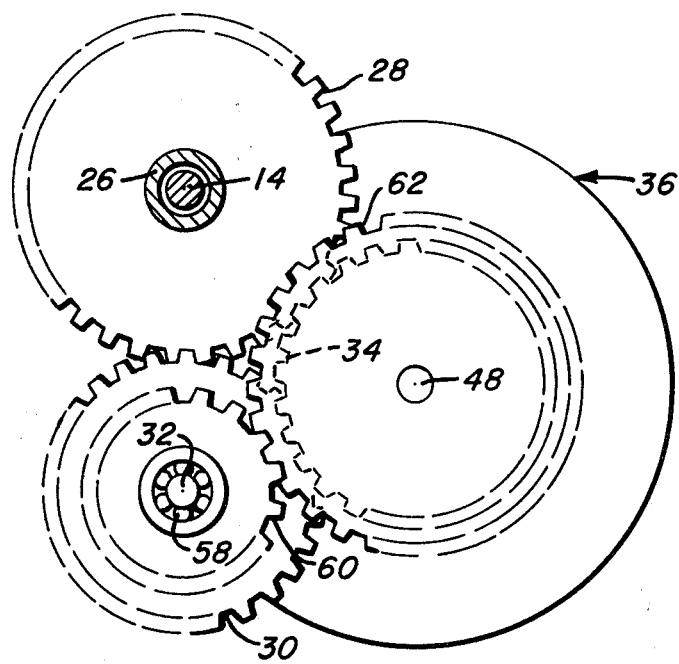
FIG. 2 is a transverse sectional view taken substantially through a plane indicated by section line 2—2 in FIG. 1.

Referring now to the drawing in detail, FIG. 1 illustrates somewhat diagrammatically a transmission arrangement for a heavy duty vehicle such as an agricultural tractor. The prime mover or engine 10 propels the vehicle through its tractor wheels 12, power being transmitted to the wheels from the engine by means of the transmission arrangement which includes the engine driven input shaft 14 that extends through the transmission arrangement to drive power take-off device 16. The transmission arrangement extending between the engine driven input shaft and the tractor wheels includes the hydromechanical transmission of the present invention generally denoted by reference numeral 18 connected in series with a three speed and reverse step change gear transmission 20 from which the differential gear assembly 22 is driven to transmit power to the tractor wheels. The step change gear transmission 20 establishes a plurality of forward and reverse speed ranges. Between the drive ratio limits of each speed range, an infinite variation in drive ratio is effected by means of the hydromechanical transmission 18.

Power is delivered to the vehicle wheels from the engine through the hydromechanical transmission 18 upon engagement of an input clutch 24 coupling the engine driven input shaft 14 to a tubular power shaft 26. A drive gear 28 is connected to one end of the power shaft 26 opposite the end to which the clutch 24 is connected. The drive gear 28 is in continuous meshing engagement with a countershaft gear 30 fixed to one end of a countershaft 32 that is rotatably mounted about a fixed axis disposed in a parallel spaced relationship to the rotatable axis for the coaxial shafts 14 and 26. The drive gear 28 is also in continuous meshing engagement with a gear 34 through which a positive, fixed ratio drive train is established between the power shaft 26 and a power planetary gear unit generally referred to by reference numeral 36.

The planetary gear unit 36 includes a planet gear carrier 38 connected to an output shaft 40 which constitutes the input to the plural speed step change gear transmission 20. The output shaft 40 is rotatably mounted about a fixed axis in parallel spaced relation to the rotational axis of the input shaft 14. Planet pinions 42 rotatably mounted by the carrier 38 are in continuous meshing engagement with an orbit ring gear 44 connected to the gear 34. The orbit gear 44 thus constitutes a drive member of the planetary gear unit to which torque is continuously transmitted in one direction from the engine along a positive power path established by the meshing gears 28 and 34. The planet pinions 42 also are in continuous meshing engagement with a sun gear 46 connected to one end of a countershaft 48 rotatably mounted about the rotational axis of output shaft 40. The sun gear 46 constitutes a control member of the planetary gear unit connected to one end of a yieldable power path through which torque is transmitted in both directions. The yieldable power path is established by a pair of fluid drive units 50 and 52.

The fluid drive units 50 and 52 may be of the hydrostatic piston type such as disclosed in U.S. Pat. No. 3,736,813 to Kress et al., as aforementioned. The fluid drive unit 50 is of the fixed displacement type and is coupled to the sun gear 46 of the planetary gear unit through the countershaft 48. The other fluid drive unit 52 is of the variable displacement type and is drivingly connected to the fixed ratio power path established by the gears 28 and 34, by means of the countershaft 32 and gear 30 in mesh with gear 28. The fluid drive units are hydraulically interconnected by means of conduits 54 in order to form a variable fluid drive assembly, the speed ratio of which is infinitely varied by controls associated with the variable displacement fluid drive unit 52, in a manner well known to those skilled in the art.

The hydromechanical transmission 18 operates in two different modes within each drive range while the drive ratio is being varied between drive ratio limits of the speed range. At the lower end of the drive ratio range, the planetary gear unit transmits power in a regenerative power circulating mode wherein the control sun gear 46 rotating in a direction opposite to that of the orbit gear 44 serves as a reaction gear. Torque is accordingly transmitted from the reaction sun gear 46 to the fluid drive unit 50 acting as a pump to drive the fluid drive unit 52 acting as a motor. During the upper end of the speed range, torque is transmitted in parallel through both power paths to the orbit gear and sun gear respectively so that the planetary gear unit then operates in a non-regenerative, power combining mode. In the latter operational mode, the variable displacement drive unit 52 acts as a pump while the fixed displacement fluid drive unit 50 acts as a motor. The power from the engine, transmitted to the power shaft 26 by engagement of the input clutch 24, is split between the two power paths respectively established by the countershaft gearing and the hydraulically interconnected fluid drive units.

Mounted within the gear 28 and in engagement with the input engine shaft 14 is an anti-coast one-way clutch 56 that will prevent free-wheeling of the vehicle when input clutch 24 is disengaged. In accordance with the present invention, a second overrunning one-way clutch 58 is also associated with the hydromechanical transmission and acts as an automatic overspeed control device. The one-way clutch 58 is mounted within a countershaft gear 60 at an end of the countershaft 32 opposite gear 30. The countershaft gear 60 is in continuous mesh with a countershaft gear 62 connected to one end of countershaft 48 opposite the sun gear 46. Ordinarily, the one-way clutch 58 freewheels so that no driving connection is established between the countershafts 32 and 48 by the meshing gears 60 and 62. The relative speeds of the countershafts 32 and 48 are determined instead by operation of the fluid drive units. However, under high input torque loading conditions, that occur for example when the input clutch 24 is suddenly engaged during start up of the vehicle, a relatively high speed ratio condition is imposed on the fluid drive units ordinarily accompanied by excessive torque loading of the fluid drive unit 50 under the regenerative power circulation mode of operation aforementioned. The increasing speed ratio between the countershaft 32 and 48 that occurs during the regenerative power mode of operation is therefore limited by engagement of the one-way clutch 58 establishing through the gears 60 and 62 a driving connection between the engine 10 and the sun gear 46 at the desired speed ratio limit. The speed ratio of the fluid drive assembly is thereby also limited to prevent any unsafe or destructive overspeeding of the fluid drive units.

Figure 3:
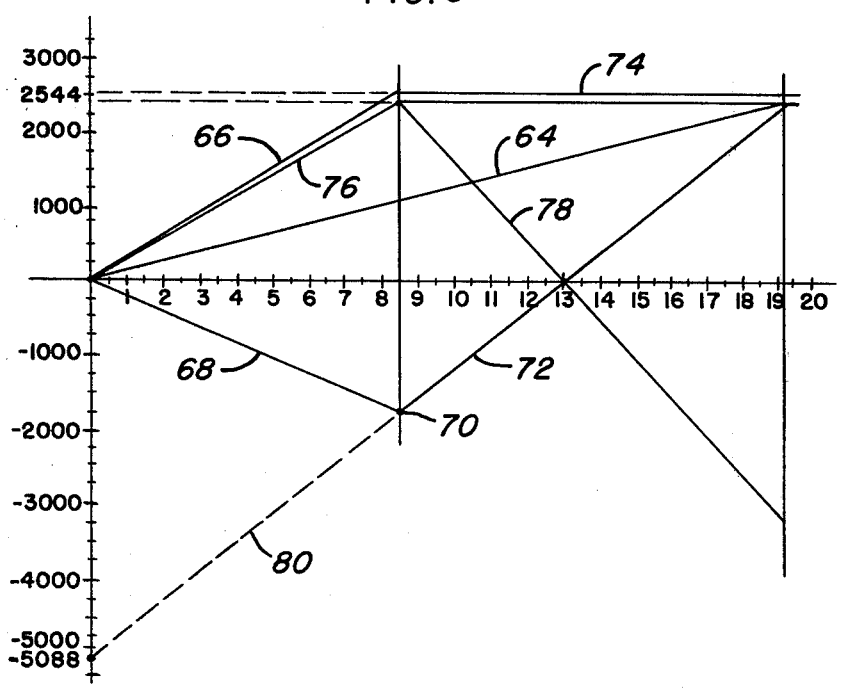
FIG. 3 is a graphical illustration depicting typical operating characteristics of the hydromechanical transmission.

FIG. 3 graphically depicts typical operating characteristics of the hydromechanical transmission within one of the forward speed ranges. Curve 64 depicts the increasing speed of the output carrier. The speed of the orbit gear 44 increases at a higher rate as shown by curve 66. The sun gear 46, on the other hand, increases its speed in a reverse direction relative to the carrier as depicted by curve 68. The increasing speed of the sun gear is, however, limited to the drive ratio limit 70 by engagement of the one-way clutch 58 as aforementioned. Thus, as the output carrier continues to increase in speed, the speed of the sun gear in the reverse direction decreases as indicated by curve 72. The direct drive connection between the engine 10 and the orbit gear limits the speed of the orbit gear to a maximum value corresponding to the curve portion 74. The speed characteristic of the orbit gear is followed by that of the fluid drive unit 52 as indicated by curve 76 in FIG. 3. Curve 78 shows the variation in speed of the countershaft gear 60 beginning with engagement of the overspeed control clutch 58. The fluid drive motor 50 being coupled to the sun gear 46 will accordingly be limited in its rotational speed as indicated by the curves 68 and 72. The dotted line extension 80 of curve 72 shows the higher speed to which the fluid drive unit 50 would be driven if not fo the overspeed control clutch 58.

The automatic engagement of the overspeed control clutch 58 and its beneficial action may be appreciated by considering what occurs when a vehicle is at a standstill and the input clutch 24 is suddenly engaged to begin rotation of the fluid drive unit 52 through the countershaft gears 28 and 30. The orbit gear 44 of the planetary gear unit will also be rotated in a forward direction at that instant. Since the vehicle is at a standstill, the planet carrier output 38 is initially stationary. To begin rotation of the planet output carrier, a relatively high reaction torque must be applied to the sun gear 46. Since the fluid drive unit 50 does not have sufficient torque capacity to provide the initially high reaction for the sun gear 46, its speed rapidly increases toward an overspeed condition. When the speed reaches the desired speed limit, determined by the relative number of teeth of the meshing gears 60 and 62, the one-way clutch 58 engages in order to establish a drive connection between the sun gear 46 and the orbit gear 44 determined by the relative number of teeth of the gears 60, 62, 30, 28 and 34. Once the load on the output carrier is overcome and the tendency for the sun gear 46 to overspeed no longer exists, then the drive ratio of the transmission may be controlled by the fluid drive units with the overspeed control clutch 58 free-wheeling. The overspeed control clutch 58 will, of course, also engage during other types of overspeeding situations caused by a suddenly applied input torque that is excessive relative to the rotating inertia of the output carrier. The input clutch 24 is provided between the engine and the transmission 18 to insure input rotation at a minimum speed because the transmission does not have a speed ratio range beginning with zero ground speed.

An alternative embodiment of the present invention is depicted in FIG. 4, wherein the torque transmitting and overspeed control device of the transmission are arranged differently. In this embodiment the drive gear 82 is in continuous meshing engagement with the countershaft gear 84 which drive the fluid drive unit 52 through countershaft 36. The countershaft gear 84 is also in continuous meshing engagement with a gear 88 connected to orbit gear 44 through which the positive, fixed ration drive train is established between power shaft 26 and the power planetary gear unit 36. By hydraulically reversing the rotation of the fluid drive unit 50 the rotation of the sun gear 46 of the alternation embodiment is opposite to the rotation of the sun gear 44 of the preferred embodiment. Since the gear 88 is indirectly driven through gear 84, the rotation of the orbit gear 44 of the alternative embodiment is also opposite to the rotation of the orbit gear 44 of the preferred embodiment. The reversal of these rotation results in the reversal of rotation of the carrier 38, thereby reversing the rotation of the output shaft 40.

These reversals of rotation allow the second overrunning one-way clutch 58 to selectively establish a driving connection between gears 90 and countershaft gear 92 under the regenerative power circulation mode of the transmission. In the alternative embodiment the one-way clutch is mounted within gear 90 and in engagement with collar 94 of the clutch 24. The gear 90 is in continuous mesh with countershaft gear 92 connected to one end of the countershaft 48 opposite the sun gear 46. Through rearranging the torque transmitting and overspeed control device of the transmission, the speed ratio of countershafts 86 and 48 is limited by the engagement of the one-way clutch 58 establishing through gears 90 and 92 a driving connection between engine 10 and the sun gear 46 at the desired speed ratio limit.

What is claimed is:

1. A transmission comprising an input member, an output member, a positive drive power train driven by the input member, a yieldable power train driven by said input member having a variable drive ratio device of limited torque transmitting capacity relative to said positive drive power train, power path combining means drivingly connecting said power trains to said output member for transmitting torque through a variable drive ratio range, and overspeed control means interconnected between said positive drive power train and said power combining means for limiting the torque loading of said variable drive ratio device without requiring a decrease in said variable drive ratio range.

2. The combination of claim 1 wherein said overspeed control means includes a one-way clutch device.

3. The combination of claim 2 wherein said variable drive ratio device includes a variable displacement fluid drive unit driven by said input member upon engagement of said input clutch means and a fixed displacement fluid drive unit coupled to the power combining means.

4. The combination of claim 3 wherein said power combining means includes a planetary gear unit having at least three operatively interengaged elements respectively connected to said power trains and said output member.

5. The combination of claim 4 wherein the element connected to said output member is a planet gear carrier.

6. The combination of claim 1 wherein said variable drive ratio range has a minimum value greater than zero.

7. The combination of claim 6 including input clutch means for selectively coupling said input member to said power trains to begin transmission of torque at said variable drive ratio above said minimum value.

8. The combination of claim 7 wherein said overspeed control means includes a one-way clutch device.

9. In combination with a planetary gear unit having an output member, a drive member and a control member for transmitting torque in a variable ratio range, fixed ratio drive means connected to said drive member for continuous transmittal of torque in one direction to said drive member, a pair of fluid drive units drivingly connected to said fixed ratio drive means and said control member respectively, fluid coupling means interconnecting said fluid drive units for rendering said fluid drive units operative to alternatively transmit torque in opposite directions to and from said control member, and overspeed control means drivingly connected between said control member and said fixed ratio drive means for limiting the speed of said control member relative to said drive member during said transmittal of torque from said control member to said fluid drive units without requiring a limitation of said variable range, whereby overloading of said fluid drive units is prevented.

10. The combination of claim 9 wherein said overspeed control means includes a one-way clutch device.

11. The combination of claim 10 wherein one of said fluid drive units connected to said fixed ratio drive means is of the variable displacement type and the other of said fluid drive units connected to said control member is of the fixed displacement type.

12. The combination of claim 9 wherein one of said fluid drive units connected to said fixed ratio drive means is of the variable displacement type and the other of said fluid drive units connected to said control member is of the fixed displacement type.

13. A transmission comprising an input member, an output member, a positive drive power train driven by the input member, a yieldable power train driven by said input member having a variable drive ratio device of limited torque transmitting capacity relative to said positive drive power train, power path combining means drivingly connecting said power trains to said output member for transmitting torque through a variable drive ratio range, and overspeed control means interconnected between said input member and said power combining means for limiting the torque loading of said variable drive ratio device without requiring a decrease in said variable drive ratio range.

14. The combination of claim 13 wherein said overspeed control means includes a one-way clutch device.

15. The combination of claim 14 wherein said variable drive ratio device includes a variable displacement fluid drive unit driven by said input member upon engagement of said input clutch means and a fixed displacement fluid drive unit coupled to the power combining means.

16. The combination of claim 15 wherein said power combining means includes a planetary gear unit having at least three operatively interengaged elements respectively connected to said power trains and said output member.

17. The combination of claim 16 wherein the element connected to said output member is a planet gear carrier.

18. The combination of claim 13 wherein said variable drive ratio range has a minimum value greater than zero.

19. The combination of claim 18 wherein said input member includes an input clutch means for selectively coupling said input member to said power trains to begin transmission of torque at said variable drive ratio above said minimum value.

20. The combination of claim 19 wherein said overspeed control means includes a one-way clutch device.

* * * * *